US012566830B2

(12) United States Patent
Mansfield et al.

(10) Patent No.: US 12,566,830 B2
(45) Date of Patent: Mar. 3, 2026

(54) BOT DETECTION FOR A SURVEY PLATFORM

(71) Applicant: SUZY, INC., New York, NY (US)

(72) Inventors: William Shawn Mansfield, Wilmington, NC (US); Jared Scott Marks, Wilmington, NC (US); Brock Carrington Prescott, Madison, AL (US); Amanda Hoffman, Bloomington, IN (US); Zachary Krepps, Wilmington, NC (US); Nicolas Gauchat, Glen Ridge, NJ (US); Albert Avi Savar, New York, NY (US); Matthew Britton, Brooklyn, NY (US)

(73) Assignee: SUZY, INC., New York, NY (US)

( * ) Notice: Subject to any disclaimer, the term of this patent is extended or adjusted under 35 U.S.C. 154(b) by 186 days.

(21) Appl. No.: 18/049,895

(22) Filed: Oct. 26, 2022

(65) Prior Publication Data

US 2023/0153406 A1      May 18, 2023

Related U.S. Application Data

(60) Provisional application No. 63/272,129, filed on Oct. 26, 2021.

(51) Int. Cl.
G06F 21/31          (2013.01)

(52) U.S. Cl.
CPC .................................. G06F 21/316 (2013.01)

(58) Field of Classification Search
CPC .................................................... G06F 21/316
See application file for complete search history.

(56) References Cited

U.S. PATENT DOCUMENTS

| | | | | |
|---|---|---|---|---|
| 7,945,952 | B1 * | 5/2011 | Behforooz .............. | H04L 63/08 |
| | | | | 726/21 |
| 9,485,237 | B1 * | 11/2016 | Johansson ............. | H04L 9/3271 |
| 11,211,140 | B1 * | 12/2021 | Satpathy ................. | G06F 21/31 |
| 11,374,915 | B1 * | 6/2022 | Munsell ................... | H04L 63/10 |
| 2013/0036342 | A1 * | 2/2013 | Deo ........................ | G06Q 30/02 |
| | | | | 715/202 |

(Continued)

OTHER PUBLICATIONS

International Search Report and Written Opinion from corresponding International Application No. PCT/US2022/047886 dated Feb. 28, 2023.

*Primary Examiner* — Catherine Thiaw
*Assistant Examiner* — Daniel Elahian
(74) *Attorney, Agent, or Firm* — Lando & Anastasi, LLP

(57) ABSTRACT

Aspects and elements of the present disclosure relate to systems and methods for determining whether a user of an application is a bot, the sequences of computer-executable instructions including instructions that instruct at least one processor to assign the user to a user classification of a plurality of user classifications for the application, provide, responsive to assigning the user to the user classification, one or more challenges of a plurality of challenges to the user over multiple instances of the user using the application, each challenge of the plurality of challenges being configured to determine whether the user is a bot, and each challenge being associated with at least one user classification of the plurality of user classifications, and change the user classification based on the user's response to the one or more challenges.

20 Claims, 15 Drawing Sheets

(56)                 References Cited

U.S. PATENT DOCUMENTS

| | | | | |
|---|---|---|---|---|
| 2016/0294556 | A1* | 10/2016 | Vortriede | ................ H04L 9/321 |
| 2020/0193009 | A1 | 6/2020 | Shafet et al. | |
| 2020/0410082 | A1 | 12/2020 | Sharieh et al. | |
| 2021/0152496 | A1 | 5/2021 | Kim et al. | |
| 2022/0300598 | A1* | 9/2022 | Ford | ........................ G06F 21/31 |
| 2023/0061311 | A1* | 3/2023 | Ludemann | ............ G06F 21/316 |

* cited by examiner

From the available options, which color do you prefer the most?

SKIP

8:41 AM          100%

Select one answer

○ Yellow

○ Purple

○ Red

○ Green

602

From the available options, which color do you prefer the most?

SKIP

8:41 AM          100%

Select one answer

604

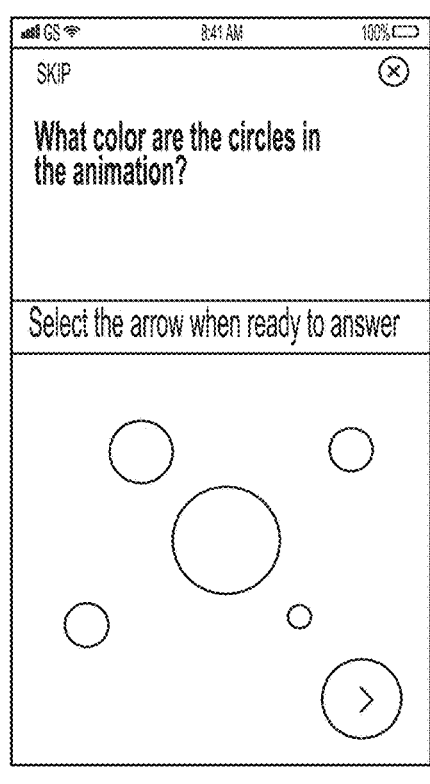
FIG. 7A
SKIP
What color are the circles in the animation?
Select your answer
○ Pink
○ Purple
○ Red
FIG. 7B
```
v <g opacity="*1" transform="*matrix(3,0,0,3,0,0)">
     <path fill="rgb(145,55,208)" fill-opacity="1"  d="
     000381469727,-3.924999952316284  -31.1590003967285
     0001525878906,-14.8000000190734863 C-48.3250007629
     0076293945,-3.924999952316284  -59.20000076293945,
     074 -48.32500076293945,14.800000190734863 -44.400
     2"></path>  ==  $0
</g>
```
FIG. 7C
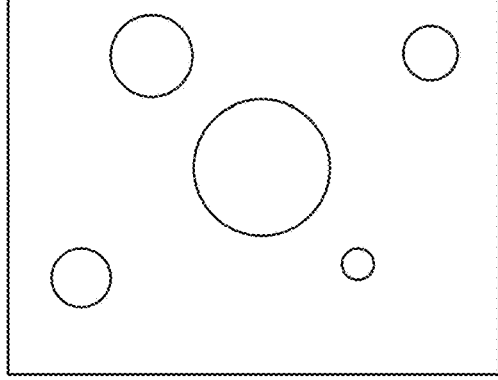
FIG. 7D

```
.one {
    .dot1,
    .dot2,
    .dot3 {
        path {
            fill: #900;
        }
    }
}

.two {
    .dot1 {
        path {
            fill:  #300tca;
        }
    }
}
```

```
colorClass:  boolean = true;
defaultColor:  boolean = false;
```

```
[ngClass j=x{
one:  colorClass is  (defaultColor,
two:  /colorClass is (defaultColor,
three:  defaultColor is  /colorClass
}'
[options]="detAnimationOptions"
```

BOT DETECTION FOR A SURVEY PLATFORM

CROSS-REFERENCE TO RELATED APPLICATIONS

This application claims the benefit of U.S. Provisional Application 63/272,129, titled BOT DETECTION FOR A SURVEY PLATFORM, filed on Oct. 26, 2021, which is incorporated herein by reference for all purposes.

BACKGROUND

Automated computer programs ("bots") may be programmed to automatically operate on the internet, for example, by filling out forms or creating accounts for websites and other services.

SUMMARY

According to at least one aspect of the present disclosure, there is provided a non-transitory computer-readable medium storing thereon sequences of computer-executable instructions for determining whether a user of an application is a bot, the sequences of computer-executable instructions including instructions that instruct at least one processor to: assign the user to a user classification of a plurality of user classifications for the application; provide, responsive to assigning the user to the user classification, one or more challenges of a plurality of challenges to the user over multiple instances of the user using the application, each challenge of the plurality of challenges being configured to determine whether the user is a bot, and each challenge being associated with at least one user classification of the plurality of user classifications; and change the user classification based on the user's response to the one or more challenges.

In some examples, the one or more challenges of the plurality of challenges include one or more of render paths, memory moats, reification, fetch guards, or Penroses. In various examples, the instructions further instruct the at least one processor to monitor the user in the application and provide a reaction responsive to detecting a trigger indicative of the user being a bot, the trigger including a user activity in the application. In many examples, the reaction includes one or more challenges.

In various examples, the instructions further instruct the at least one processor to associate each user classification of the plurality of user classifications with a respective ruleset, the respective ruleset having one or more rules. In some examples, each rule of the one or more rules includes at least one trigger and at least one reaction, and the instructions further instruct the at least one processor to execute the at least one reaction responsive to detecting the at least one trigger occurring. In many examples, the instruction further instruct the at least one processor to ban the user responsive to determining that the user is a bot. In various examples, a quantity or difficulty of at least one challenge of the one or more challenges associated with a respective user classification of the plurality of user classifications is proportional to a respective level of scrutiny of a plurality of levels of scrutiny associated with the respective user classification. In some examples, the plurality of user classifications includes a first user classification associated with a first level of scrutiny of the plurality of levels of scrutiny, and a second user classification associated with a second level of scrutiny of the plurality of levels of scrutiny, the first level of scrutiny being less than the second level of scrutiny.

In various examples, the at least one processor is further instructed to adjust the user classification by assigning the user a point value between a first threshold and a second threshold, adjusting the point value to change in a direction of the second threshold responsive to the user providing an incorrect response to the one or more challenges, and adjusting the point value to change in a direction of the first threshold responsive to the user providing a correct response to the one or more challenge. In many examples, at least one classification of the plurality of classifications has a respective first threshold and a respective second threshold. In various examples, the processor is further instructed to provide a first of at least two related challenges at a first time and a second of the at least two related challenges at a second time different than the first time, the first time being during a first use of the application by the user and the second time being during a second user of the application by the user.

According to at least one aspect of the present disclosure, there is provided a method of determining if a user of an application is a bot, the method comprising: assigning the user to a user classification of a plurality of user classifications of the application; providing, responsive to assigning the user to the user classification, one or more challenges of a plurality of challenges to the user over multiple instances of the user using the application, each challenge of the plurality of challenges being configured to determine whether the user is a bot, and each challenge being associated with at least one user classification of the plurality of user classifications; and changing the user classification based on the user's responses to the one or more challenges.

In some examples, the one or more challenges of the plurality of challenges include one or more of render paths, memory moats, reification, fetch guards, or Penroses. In various examples, the method further comprises monitoring the user in the application and providing a reaction response to detecting a trigger indicative of the user being a bot, the trigger including a user activity in the application. In many examples, the reaction includes one or more challenges. In some examples, the method further comprises banning the user responsive to determining that the user is a bot. In various examples, the method further comprises associating each respective user classification of the plurality of user classifications with a respective ruleset, the respective ruleset having one or more rules. In various examples, each rule of the one or more rules includes at least one trigger and at least one reaction, and the at least one reaction is executed responsive to detecting the at least one trigger occurring.

According to at least one aspect of the present disclosure, there is presented a system for determining whether a user of an application is a bot, the system comprising: a survey platform configured to host the application; at least one controller configured to: assign the user to a user classification of a plurality of user classifications on the application; detect user activity on the application hosted on the application platform; provide, responsive to assigning the user to the user classification, one or more challenges of a plurality of challenges to the user over multiple instances of the user using the application, each challenge of the plurality of challenges being configured to determine whether the user is a bot, and each challenge being associated with at least one user classification of the plurality of user classifications; and change the user classification based on the user's response to the one or more challenges.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 7A illustrates an interface according to an example;

FIG. 7B illustrates an interface presenting a question according to an example;

FIG. 7C illustrates an example of code for displaying a color according to an example;

FIG. 7D illustrates a graphic in an unrendered state according to an example;

DETAILED DESCRIPTION

Figure 1:
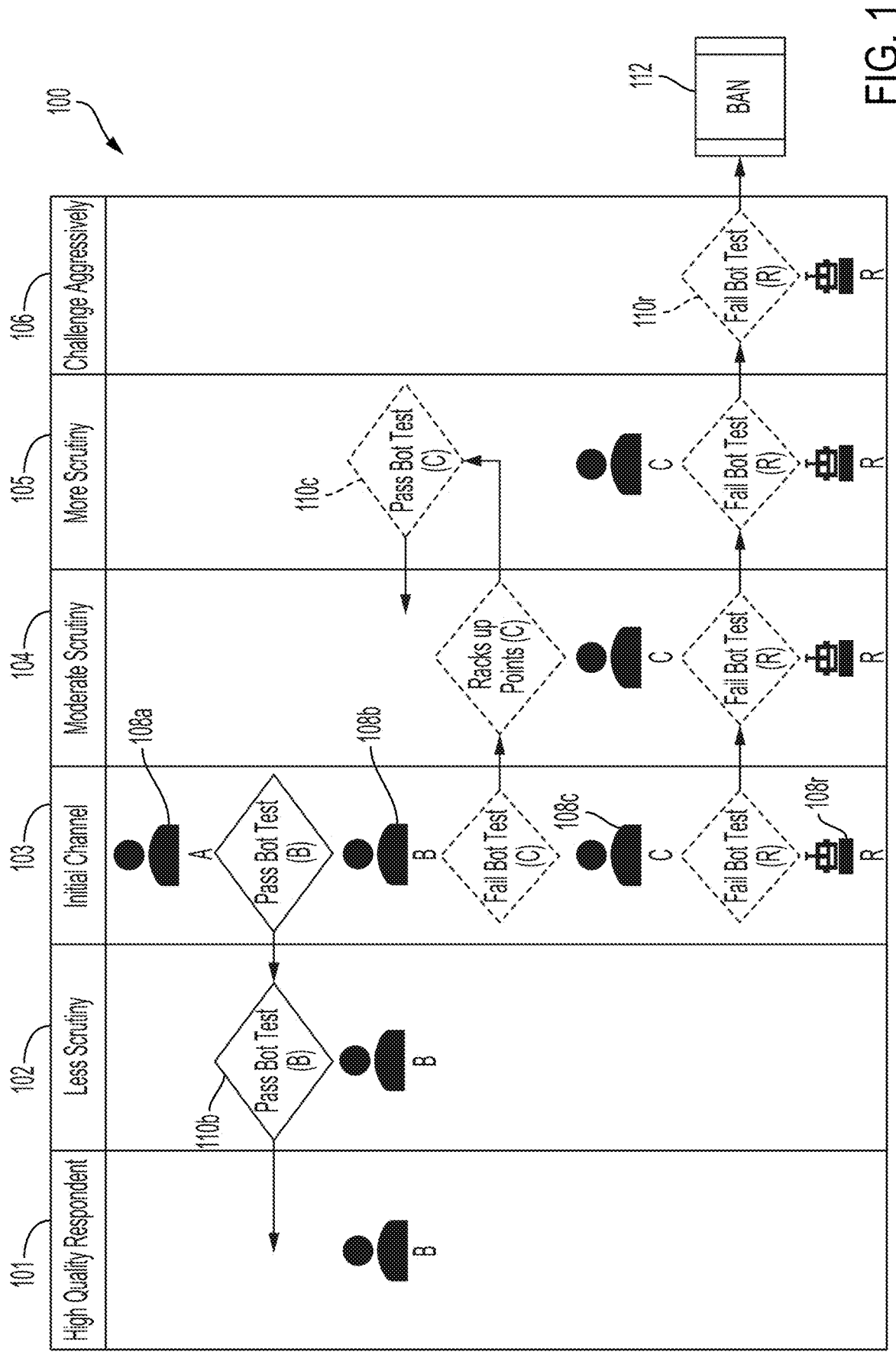
FIG. 1 illustrates a chart showing how certain user behaviors may change the classification of a user in a channel according to an example.

One or more embodiments include components and processes for monitoring a market research survey platform and detecting and eliminating automated programs ("bots") that attempt to take advantage of the survey platform. The platform may include components configured to intercept potential bot activity and react accordingly. The platform may be interactive, so that operators can analyze tracked behaviors and ensure appropriate reactions. The platform also may be extensible, so that additional and/or more complicated traps can be developed to catch more sophisticated bots. The platform may be configured to make it more difficult (and therefore ultimately cost-prohibitive) to design a bot that can pass increasingly complex bot tests.

Unlike simple gatekeeping techniques, the platform's reach extends beyond the registration process, allowing it to even detect bots that "take over" existing accounts which were previously verified as legitimate. By integrating seamlessly into and within an application's flow, the platform allows users to engage with the product naturally even while potentially suspicious behaviors are being monitored.

In an embodiment, the platform's layering of tests with automated observation of user behavior allows it to monitor users in different ways over time, giving legitimate users plenty of chances to prove themselves without even being aware that they are doing so, while swiftly moving to ban users whose behavior indicates that they are attempting to game the system in some way.

For the purpose of this description, the term "bot" refers to a software application programmed to automatically perform tasks, such as flooding web and/or mobile applications with automated tasks, which relieve a human from spending time or cognitive energy to authentically perform the required tasks. More specific to this context, bots can be programmed to automatically answer survey questions on a survey platform in exchange for some type of benefit or reward. Bots are problematic for a survey platform for at least two reasons: (1) platform clients are paying for legitimate responses from real users, not automated, inauthentic responses from bots, and (2) bots earn rewards without providing legitimate responses, which results in an economic loss for the survey platform.

A "user" may refer to any survey respondent or anyone using a software application, for example, natural persons using the internet. Based on specific behaviors, some users are considered to be bots (or low-quality respondents) while others are considered "human" or high-quality respondents.

In an embodiment, the platform is configured to intercept survey activity, and to observe and react to certain behavior without interrupting the flow of the survey application. The platform may also be configured to hijack a request for a survey question and replace it with a seamlessly delivered "bot test" or bot-trapping pathway, integrated with the survey platform, so that the "test" appears to the user as a typical survey question.

In an embodiment, the platform is configured to use a layering technique of various channels and may test users in different ways over time, giving users ample runway to prove their authenticity. Using multiple channels of increasing scrutiny gives users a variety of chances to prove they are not bots, so that false positives of bot-like behaviors will not prematurely cause user removal.

FIG. 1 illustrates an example chart 100, according to an embodiment, of how certain user behaviors that are marked as triggers may be tied to a reaction that transitions a user from one channel to another.

The chart 100 includes six columns 101, 102, 103, 104, 105, 106, from right to left indicating the classification of various users according to how frequently they are challenged to prove they are not bots (that is, to prove they are natural persons). The columns include a first column 101, labeled "High Quality Respondent," a second column 102, labeled "Less Scrutiny," a third column 103, labeled "Initial Channel," a fourth column 104, labeled "Moderate Scrutiny," a fifth column 105, labeled "More Scrutiny," and a sixth column 106, labeled "Challenge Aggressively." The chart 100 further includes a plurality of users, including a first user 108a (labeled "A"), a second user 108b (labeled "B"), a third user 108c (labeled "C"), and a fourth user 108r (labeled "R"). Various decisions blocks 110b, 100c, 110r are shown as well, as is a ban subprocess 112 ("ban 112").

Users begin in the third column 103, where they are subject to the default amount of scrutiny. That is, users assigned to the initial channel are subject to the default amount of scrutiny. As users are challenged by tests designed to determine whether the user is a bot, the user will either move toward less scrutinized and less challenged classifications, such as the first column 101 and second column 102, or the users will be moved to more scrutinized (that is, more examined and challenged) classifications, such as the fourth, fifth, or sixth columns 104, 105, 106. If a user is determined to be a bot by failing bot tests in the most scrutinized classification ("Challenge Aggressively") of column six 106, the user will be banned according to the ban subprocess 112. For the purpose of clarity and explanation, the term "challenge" will refer to testing the user to check whether the user is a bot.

The first user 108a is a default user, such as a user who has recently joined or does not participate frequently enough for challenges to clearly determine the user's status. The first user 108a is thus assigned to column three 103, and will be subject to ordinary amounts and types of scrutiny.

The second user 108b is similarly assigned to column three 103 initially. The second user 108b may be challenged with tests designed to determine whether the user is a bot, as shown at the decision blocks 110b labeled with a "B." The second user 108b may pass the challenges (such as bot tests) presented in column three 103 and thus may be promoted to column two 102. The user 108b may be challenged in column two 102 and may pass the challenges presented in column two 102, and thus may be promoted to the least scrutinized category of column one 101 ("High Quality Respondent").

The fourth user 108r may, in some examples, be a bot. The fourth user 108r will initially be assigned to the Initial Channel category of column three 103. The fourth user 108r may be challenged and fail the bot tests of column three 103, and thus be demoted to column four 104, where the fourth user 108r will be categorized as requiring moderate scrutiny, and will be challenged more or by different kinds of bot tests compared to column three 103. The fourth user 108r may fail the bot tests of column four 104, and thus be demoted to column five 105, where the fourth user 108r may be subject to even greater scrutiny. The fourth user 108r may be challenged and fail the challenges of column five 105 and be demoted to column six 106. In column six 106, the fourth user 108r may be subject to aggressive challenges, such as being subjected to frequent and/or difficult bot tests. If the user fails the bot tests of column six 108, the user will be banned by the ban subprocess 112. A banned user is not able to access the application, services, website, surveys, or other systems (collectively, "applications"), thus preventing the banned user from participating with or using said applications.

The third user 110c illustrates an example of a user who fails some challenges but also passes some challenges. As can be seen, the third user 110c is initially seeded to the third column 103, and is subject to the default amount of scrutiny. The third user 110c may fail the challenges of the third column 103, and thus be demoted to the fourth column 104 and subjected to greater scrutiny. The third user 108c may fail the challenges of the fourth column 104 and thus be demoted to column five 105 and subjected to greater scrutiny. The third user 108c may pass the challenges of column five 105 and thus be promoted to column four 104, and therefore be subjected to relatively less scrutiny compared to column five 105.

As shown with the third user 108c in column four 104, failing a single challenge may not be sufficient to demote the user to a more scrutinized category. In some examples, users such as the third user 108c may be categorized according to a point value, with points being assigned or removed depending on the user's passing and failing of challenges. For example, user categories (i.e., user classifications into channels) may be determined by the point value associated with the user, with each category corresponding to a range of point values. Each category may therefore have an upper point threshold and a lower point threshold, and the user's point value may determine whether they are moved from one category to another. For example, the user's point value may be adjusted in the direction of a given point threshold (that is, the point value may be decreased if the point threshold is below the point value or increased if the point threshold is above the point value). If the user's point value equals or passes the point threshold, the user may be moved to a different category. As an example, suppose the user has a point value of 10, and the user's current category has thresholds of 11 and 3. If the user falls below three due to responses to challenges, the user may be moved to a category having thresholds of 2 and −7. The level of scrutiny may change depending on the category. As a result, supposing in the example that correctly answering responses reduces the user's point value, the category corresponding to thresholds of 2 and −7 may be less scrutinized than categories corresponding to point values above 2. Of course, this is only one example, and lower point values do not need to correspond to less scrutinized categories. The level of scrutiny may increase with decreasing point values, or decrease with decreasing point values, and so forth.

In general, any user may be subjected to challenges to determine whether the user is a bot, and the user's categorization (and thus the amount, frequency, type, and/or difficulty of the challenges) may be adjusted based on the user's categorization. The number of categories need not be limited to merely six, but may be any number greater than or equal to two.

Challenges may be administered at any time. For example, a user may be subjected to a challenge while using the application. In some examples, the challenge may be explicit, such as a request to perform a task that tends to indicate whether the user is a bot. In some examples, the challenge may be implicit, such as an analysis of the user's behaviors that tend to indicate whether the user is a bot.

Figure 2:
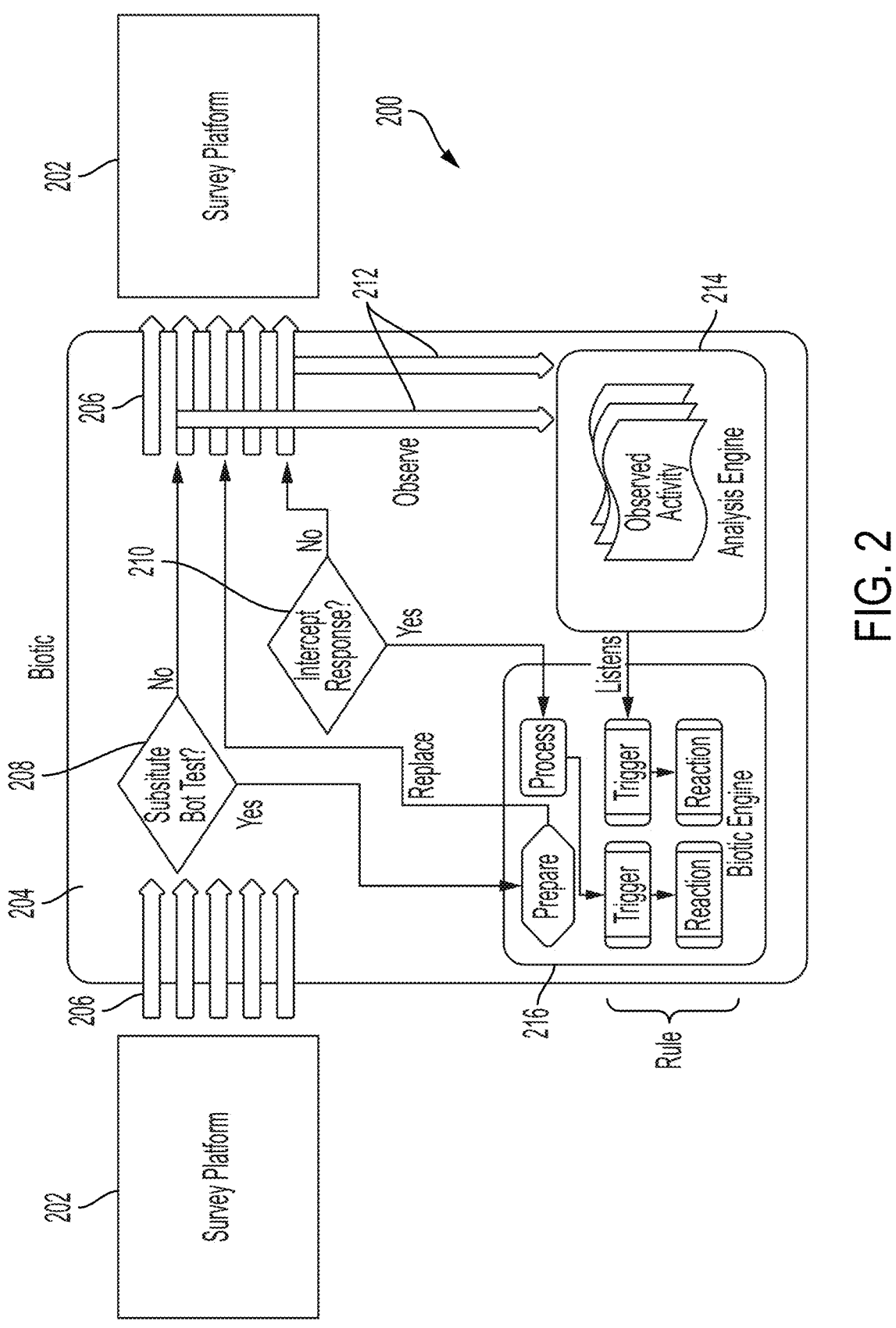
FIG. 2 illustrates bot detection system according to an example.

FIG. 2 illustrates one example of how a bot detection system 200 may silently listen for activity happening within the survey application and may observe and react without the user being aware of it.

The bot detection system 200 includes a survey platform 202 ("application 202"), a detection platform 204 ("platform 204"), a plurality of survey questions 206, a substitute bot test decision block 208 ("substitute block 208"), an intercept response block 210 ("intercept block 210"), intercepted questions and answers 212 ("intercepted answers 212"), an analysis engine 214, and a bot detection engine 216.

In some examples, the application 202 will provide questions to a user. For example, the application 202 may be an online survey presenting a series of questions about a given topic to a user. To detect whether the user is a bot, the detection platform 204, which may be implemented as a computer program or computer algorithm, may alter or add to the questions provided to the user. For example, the detection platform 204 may insert one or more additional questions into the survey (in order, randomly, at intervals, and so forth). The inserted questions may be designed to test whether the user is a bot. The detection platform 204 may record and analyze answers to the inserted questions to determine whether the user is a bot, or whether the user is more or less likely to be a bot. The detection platform 204 can then adjust the types of challenges and/or questions inserted into the survey based on the categorization of the user (such as a category corresponding to how strongly the detection platform 204 believes the user is a bot or a human), or based on a probability that the user is a bot or a human, and so forth. The detection platform 204 may provide the questions with the accompanying user answers back to the application 202. In some examples, the detection platform 204 may return only the questions and corresponding answers for questions that were not inserted by the detection platform 204 into the questions provided by the application 202 originally.

Furthermore, in some examples, it may be desirable to test a given user over time. For example, the detection platform 204 need not test a user immediately and completely. Testing of the user may be spread out over time or over multiple sets of survey questions, or multiple instances of the user using the application 202. For example, an inserted question may ask how many children the user has. The detection platform 204 may record the user's answer to that question. At a later time, such as during a different survey, during a different time (such as a different day, month, or year), or in a later question in the same survey, the detection platform 204 could again ask a question that determines how many children the user has. If the user provides a different number of children each time, the detection platform may determine that the user is a bot or more likely to be a bot, and can take or recommend appropriate action. Various examples of suitable challenges will be discussed below, with respect to figures such as FIGS. 6A-10 and 12, among others. In this manner, the detection platform 204 may create longitudinal profiles of users and test whether a user is a bot over various periods of time based on the consistency or human-like qualities of the user's responses.

The application 202 may be any application, but in some examples may be a survey application that provides survey questions to users and receives answers to the survey questions from users. The application 202 provides a plurality of survey questions 206 to the user. The survey questions 206 may be provided to the user via the detection platform 204, or the detection platform 204 may receive the survey questions 206 prior to the user receiving the survey questions, and may determine whether the user has been challenged or whether the user should be challenged at the substitute block 208. If the detection platform 204 determines the user should be challenged, the platform may insert additional survey questions configured to test whether the user is a bot. The detection platform 204 may intercept the user response to the inserted questions, for example at the intercept block 210. In some examples, the detection platform 204 may be configured to intercept answers to only the inserted questions, thus preserving the privacy and/or anonymity of the user's responses to the questions originally provided by the application 202. The intercepted answers 212 may be observed by the analysis engine 214, and may be provided to the detection engine 216.

The detection engine 216 may check to see whether the intercepted questions and answers 212 meet the requirements of a trigger such that a reaction is warranted and/or required. The detection engine 216 may then take the appropriate reaction if the trigger conditions are met. Triggers, reactions, rules, and rulesets will be discussed in greater detail below, such as with respect to FIG. 3.

In addition to the foregoing, the detection system 204 may seamlessly insert questions into the survey questions 206 provided by the application 202. For example, the detection system 204 may insert questions into the survey questions 206 prior to any survey-question-related data being provided to the user. Accordingly, the user may not be able to distinguish inserted questions from the original survey questions 206. In this manner, a user that is a bot may provide incoherent or incorrect answers to survey questions which a human would be able to answer correctly.

Some or all of the components of the platform may be organized into the following hierarchy: A "rule" includes a "trigger" and a "reaction." A "ruleset" includes a set of "rules." A "channel" associates a user with a ruleset designed to test a user's legitimacy, and may determine which challenges a user is subjected to.

Figure 3:
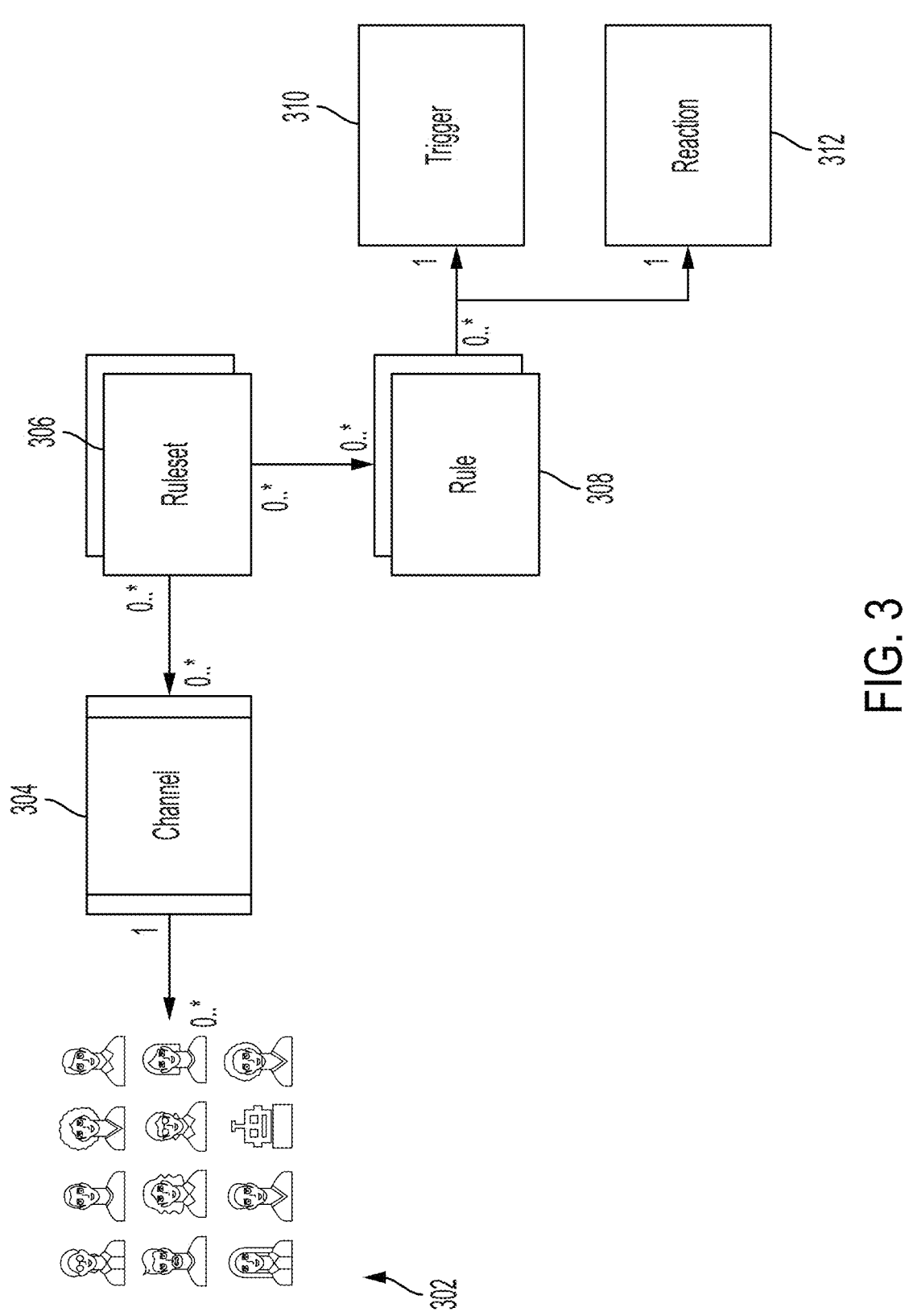
FIG. 3 illustrates a relationship between users, channels, rulesets, rules, triggers, and reactions according to an example.

FIG. 3 illustrates an example, according to an embodiment, of a relationship between users, channels, rulesets, rules, triggers, and reactions. FIG. 3 includes a plurality of users 302 ("users 302"), at least one channel 304 ("channel 304"), a plurality of rulesets 306 ("rulesets 306")), a plurality of rules 308 ("rules 308"), at least one trigger 310 ("trigger 310"), and at least one reaction 312 ("reaction 312").

In an embodiment, a trigger 310 is an event that occur because of a user's action, or are collected metrics about a user. The trigger 310 may be defined by engineers, who write the logic to identify when a behavior has occurred. As non-limiting examples, the trigger 310 may include: a user changed their email address twice in last month; user answered 5 questions in less than 3 seconds; user has selected the same ordinal option more than 10 times in a row; user has amassed a known value of fungible benefits (e.g., points to convert to a gift card balance). In an embodiment, a reaction 312 is the platform's response to the trigger 310. The reaction 312 may be defined by engineers. Non-limiting examples of the reaction 312 may include, for example: assigning a user to a different channel 304 (such as a different categorization as those shown in FIG. 1, e.g., column one 101 through column six 106); flagging a user as either bot-like or legitimate; sending a user an email. As described herein, the reaction 312 may include serving a bot-trapping pathway to the user (such as challenging the user), which may be performed in a seamless way that does not alert the user that they are suspected of potentially being a bot.

In an embodiment, rules 308 may be produced by platform operators and include at least one trigger 310 and at least one reaction 312. An operator or engineer may create a rule or rules 308 by associating one or more trigger 310 with one or more reaction 312 and assigning a name to the association of the one or more trigger 310 with the one or more reaction 312. As a non-limiting example of a rule, the trigger 310 may be failing a challenge and the reaction 312 may be flagging the user as bot-like or relatively more bot-like and/or suspicious. In some examples, the reaction 312 may be banning the user.

In an embodiment, rulesets 306 may be configured by platform operators and include one or more rules 308 bundled together. An operator may add rules 308 to a ruleset 306 and then associate that ruleset 306 with a channel 304.

In an embodiment, channels 304 may be configured by platform operators. Channels 304 include rulesets 306 in which a user's behavior triggers, via one or more trigger 310, one or more reaction 312. Every user may "dwell within" (i.e., be logically assigned to and receive a user experience according to) a platform channel 304. A user's behavior that matches a set trigger 310 may cause a reaction 312. That reaction 312 may be, for example, to send the user to a different channel 304 (that is, to demote the user to a more scrutinized channel, or promote the user to a less scrutinized channel, for example as described with respect to FIG. 1). For example, if the platform determines that a user's behavior is suggestive of the user being a bot, the platform may send the user to a channel 304 that includes one or more bot-trapping pathways. Different channels may include different numbers and/or kinds of bot-trapping pathways. If a user fails one or more bot-trapping pathways in a particular channel 304, the platform may send the user to another channel 304 with one or more different bot-trapping pathways that require the user to pass a greater level of scrutiny. If a user passes one or more bot-trapping pathways, the platform may keep the user in the same channel 304 or promote the user to a less scrutinized channel 304.

Figure 4A:
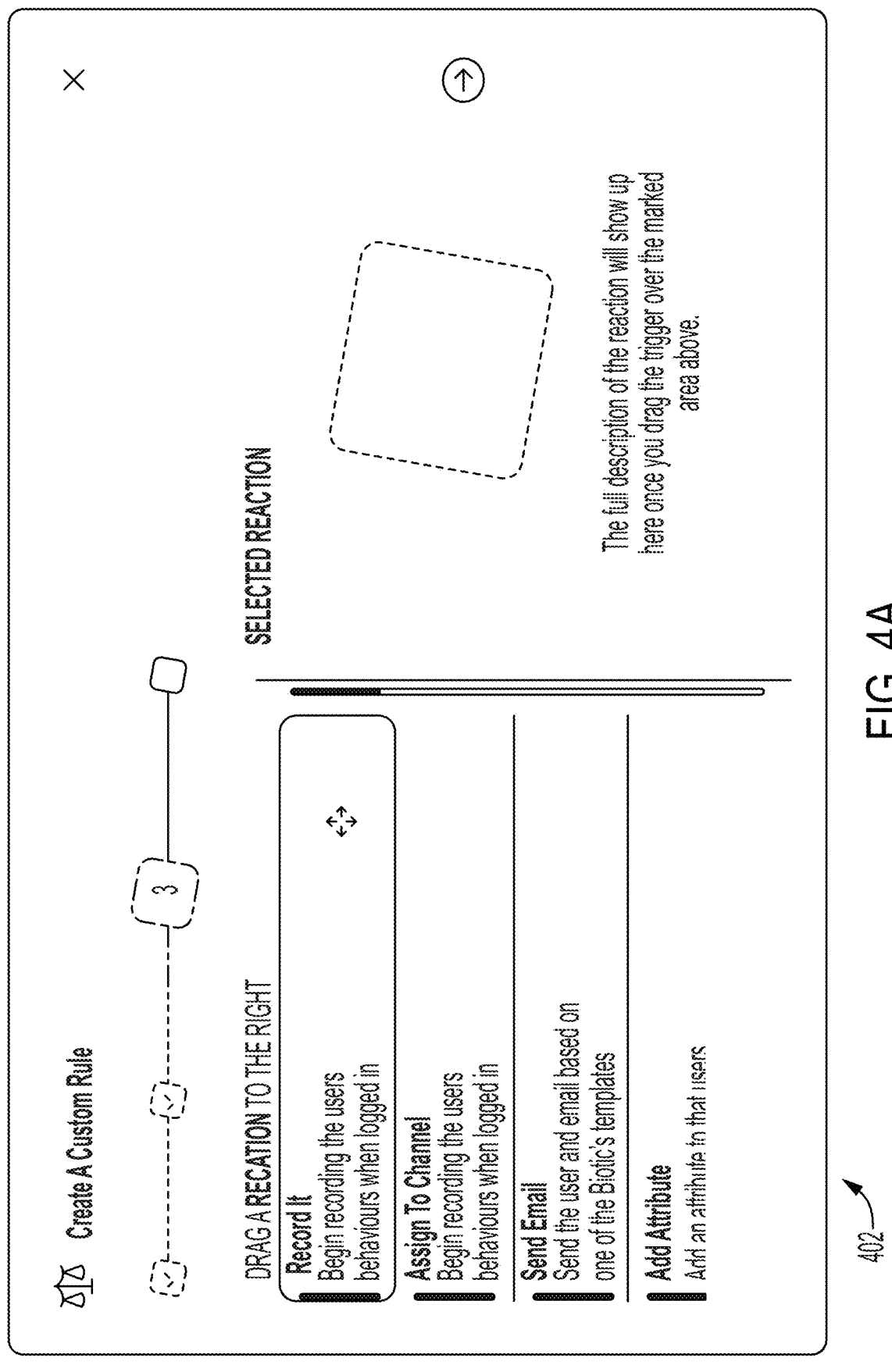
FIG. 4A illustrates an interface according to an example.
Figure 4B:
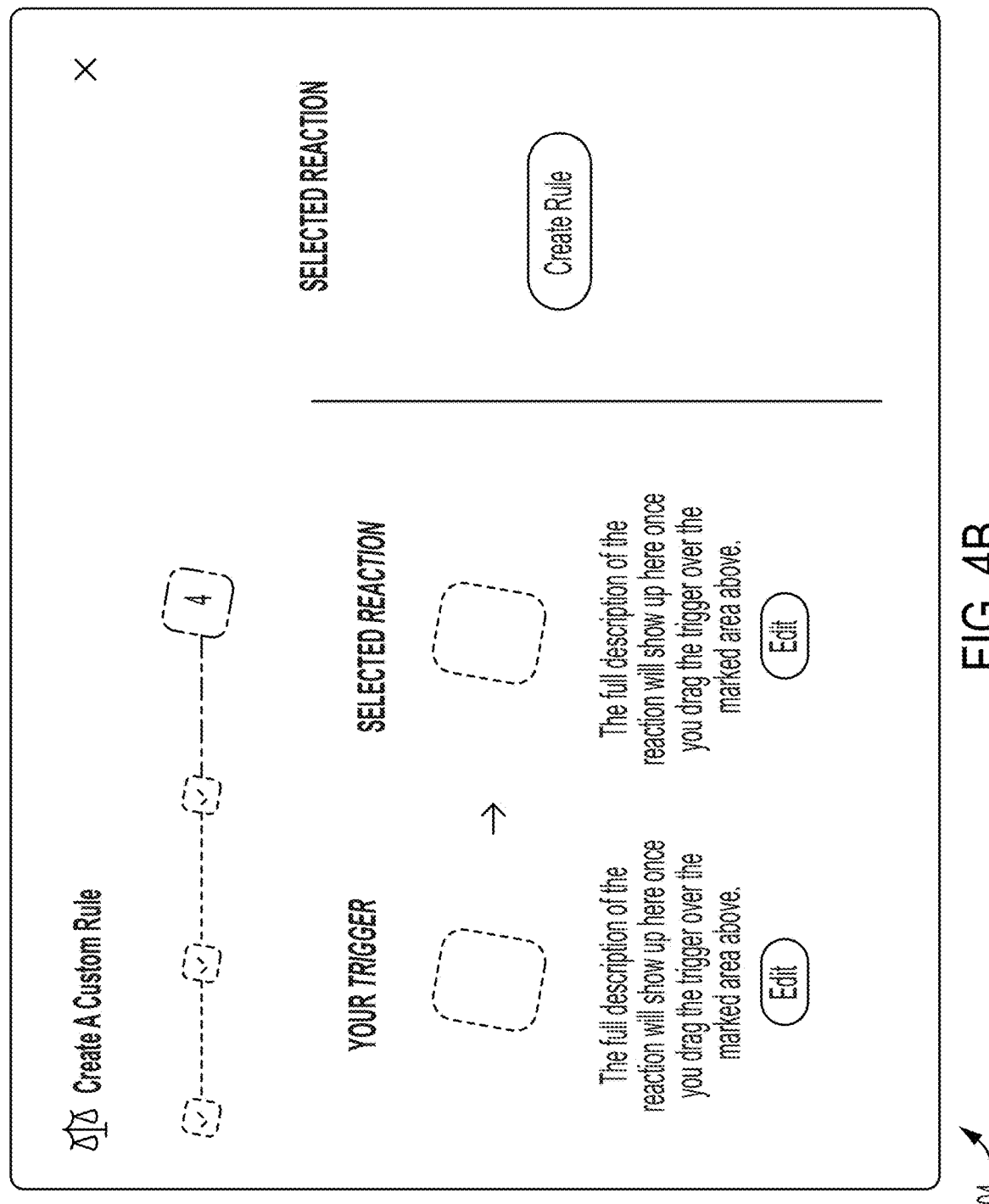
FIG. 4B illustrates an interface according to an example.

FIGS. 4A and 4B illustrate an example of a user interface for constructing a rule according to an embodiment.

FIG. 4A illustrates an interface 402 showing how an operator or engineer may construct a reaction according to an example. It is given, in this example, that the user has already selected a trigger 310 and may have provided a name for the rule. As shown, the operator is prompted to select one or more reactions 312 from a list of reactions on the left side of the interface and to drag the desired reactions to the right side of the interface, where the chosen reaction 310 or reactions will populate a list. When the trigger 310 condition is met, the reaction 312 or reactions will occur.

FIG. 4B illustrates a summary interface 404 according to an example. The summary interface 404 shows the selected trigger 310 or triggers and the selected reaction 312 or reactions 312 on the left side of the interface. The triggers are on the left-most portion of the interface and the reaction is in the center portion of the interface. On the right of the interface, a "Create Rule" button is provided. Pressing the button may finalize and/or deploy the rule to a selected channel 304 or to a selected ruleset.

It will be noted that FIG. 4A and FIG. 4B show a process comprising four steps, and that FIG. 4A shows step three and FIG. 4B shows step four. Step one may, in some examples, include naming the rule, selecting a ruleset or channel to deploy the rule to, and so forth. Step two may include selecting a trigger 410 or triggers from a list similar to that shown in FIG. 4A, and dragging the selected trigger 410 or triggers to a portion of the interface where the selected triggers are displayed.

Figure 5A:
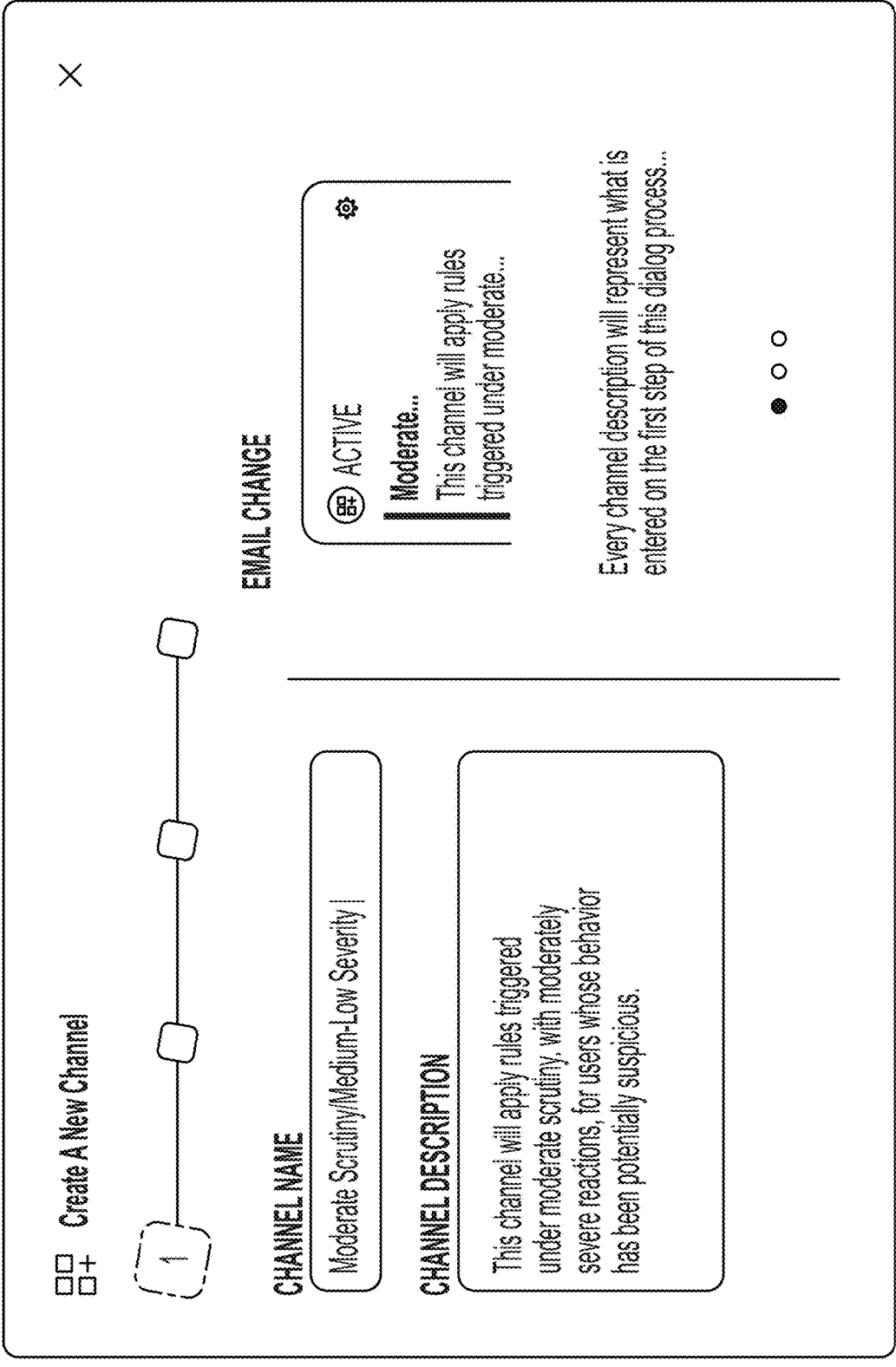
FIG. 5A illustrates an interface according to an example.
Figure 5B:
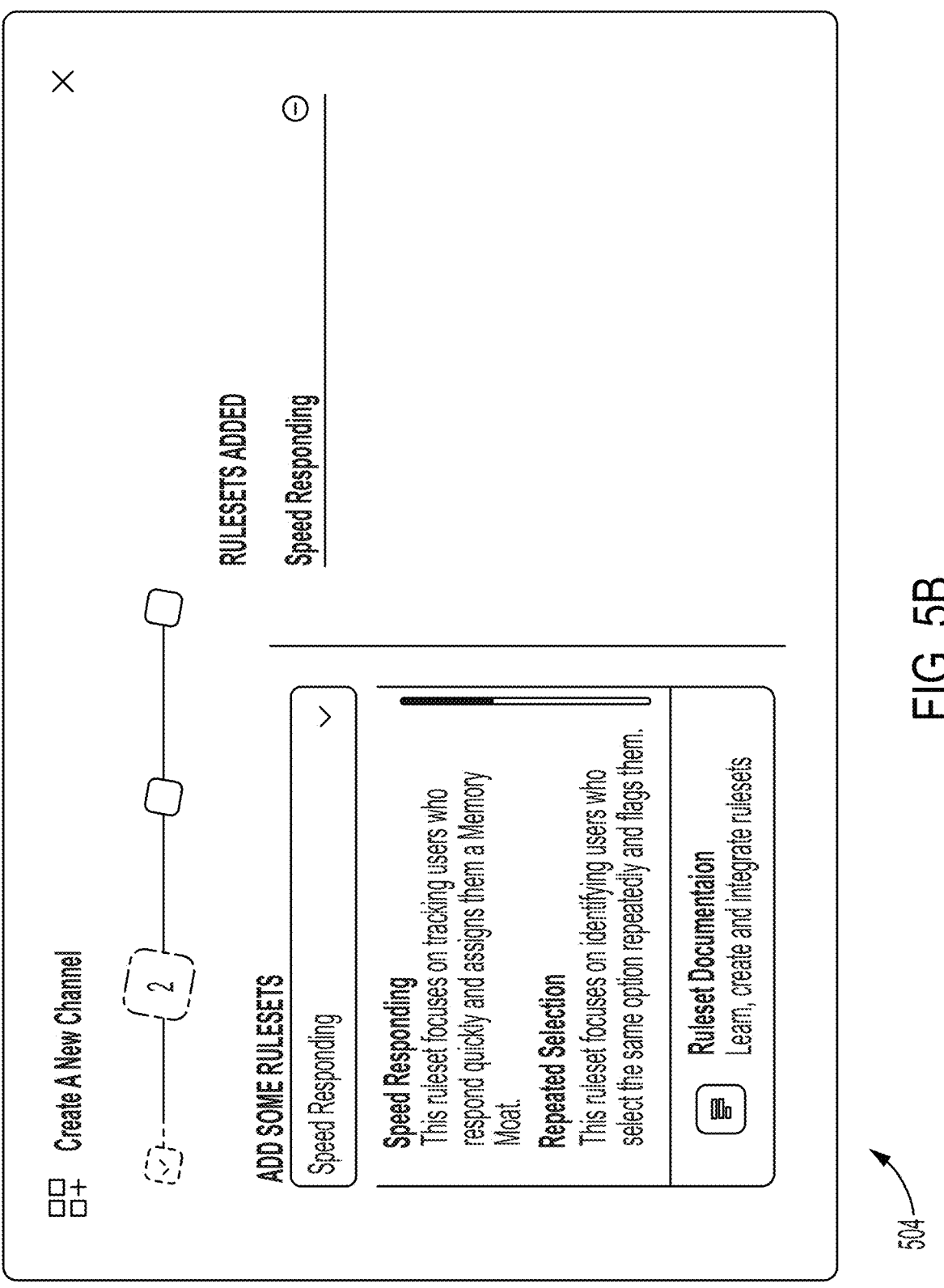
FIG. 5B illustrates an interface according to an example.

FIGS. 5A and 5B illustrate an example of an operator interface for creating a channel according to an embodiment.

FIG. 5A illustrates an interface 502 for naming channels (such as channel 304), describing said channel, and assigning rulesets to the channel according to an example. As shown, the interface includes a "Channel Name" field for providing the channel with a name, and a "Channel Description" field for describing the channel. The name and description of the channel may be available to the operator but not the user.

FIG. 5B illustrates an interface 504 for assigning and/or deploying rulesets (such as rulesets 306) to a channel (such as channel 304) according to an example. As shown, the interface 504 includes a selection field labeled "Add Some Rulesets" that provides the operator with the ability to select from among different categories of rulesets. The selection field may trigger a dropdown menu that contains specific rulesets ("Speed Responding" and "Repeated Selection" in the example interface 502). The operator may select desired rulesets and add those rulesets to the channel. The selected rulesets will be displayed on the right portion of the interface ("Rulesets Added"), in a list. The operator may remove rulesets from the selected rulesets, for example, by pressing a remove ruleset button (for example, a circle with a line in the middle of it, as shown in the example).

In some embodiments, multiple different bot-trapping pathways may be served to respondents as reactions to triggers. Each pathway challenges the user on a different, inherent shortcoming of bots. Potential bot-trapping pathways include memory moats, render paths, reifications, fetch guards, and Penrose. Each of these pathways will be discussed in greater detail below.

In an embodiment, Memory Moats rely on the inability of a bot to remember, in sequence, the same preference twice. Memory moats are designed to test whether a user can (1) remember an earlier response, and (2) choose the same response when served in a different layout type. Memory moats may include two or more questions served to respondents, not necessarily served back-to-back, requesting strong personal preferences or statements of fact that typically remain unchanged over short periods of time. Memory moats challenge bots to make the same selection in separate instances from a fixed set of choices. Each survey question presents the same selection, but in a different layout type. Memory moats may utilize familiar categories with unique options, such that human users who are predisposed to one choice will very likely make that same choice again in a subsequent question. Though bots can be programmed to demonstrate "memory"—i.e., they can recall their previous responses—bots will likely fail to relate that stored memory when the layout types of answer choices are changed from one question to another.

Figures 6A, 6B:
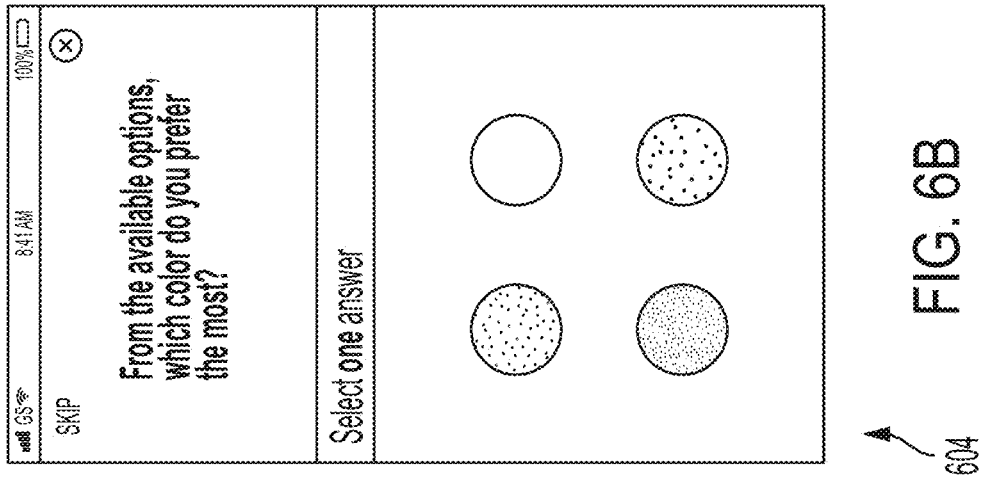
FIG. 6A illustrates a memory moat according to an example.
FIG. 6B illustrates a memory moat according to an example.

FIGS. 6A and 6B illustrate an example of a memory moat pairing according to an embodiment.

FIG. 6A illustrates a first memory moat pair element 602 asking the user to identify the user's preferred color according to an example. As shown, the question is presented in an upper portion of the interface and the answers are presented in a lower portion of the interface. The answers include various colors—in this example, yellow, purple, red, and green.

FIG. 6B illustrates a second memory moat pair element 604 asking the user to identify the user's preferred color according to an example. As with FIG. 6A, the question is provided in the upper portion of the interface. In this example, the question is phrased identically to the question in FIG. 6A, though the question need not be phrased identically in the memory moat pair. In contrast to FIG. 6A, in the lower portion of the interface, four colored circles are presented, each circle having a respective color of yellow, purple, red, or green. If the user selected yellow in response to the challenge presented in FIG. 6A, the user would be expected to select the yellow circle in response to the challenge presented in FIG. 6B, as an example.

The following is a non-limiting example of operations for using a memory moat according to an embodiment. A respondent may be asked a question about a common, strong personal preference such as a favorite color or suit of playing card, their most used emoji, or coffee/tea preference, for example as shown in FIG. 6A. In a later question, the respondent may be served the same question with the same answer choices, but the answer choices may be displayed in a different way. For example, if the first question is served with text answer choices, the second question may have images as answer choices, or vice versa, as shown in FIG. 6B. Moving through this experience, the respondent may (a) demonstrate their legitimacy by selecting the "same" answer choice in both questions, or (b) select "different" answer choices across the questions and provide the platform with a reason to be suspicious.

In an embodiment, render paths rely on the fact that bots take shortcuts by bypassing the rendering process, leveraging only the underlying API and automation, to quickly capture the information the bot is interested in sourcing.

In an embodiment, the render path technique enforces the requirement of a full render path and essentially showcases when a bot has been trying to take shortcuts. Specifically, this technique leverages the expectation that at least the following is true: (1) full execution of the rendering path has completed; (2) switches/augmentations made during render are accurate; and (3) false data is properly ignored. When a bot takes a shortcut to directly access API calls but does not wait for the rendering path to complete, it will likely fail to answer simple prompts that can only be answered correctly after a rendering path has fully executed.

Figures 7E, 7F:
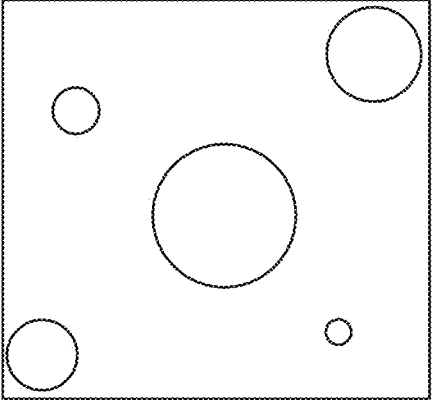
FIG. 7E illustrates an example of code for changing the rendering of a color according to an example.
FIG. 7F illustrates a graphic in a rendered state according to an example.

In one non-limiting example, a background is coded to be purple, but the renderer is designed to remove red under certain scenarios. A bot that is not relying on visual rendering will answer questions based on the supplied data instead of what visually presents after the rendering path completes. FIGS. 7A-7F below illustrate an example of a render path for a survey question about what color the user sees, according to an embodiment. Specifically, FIGS. 7A and 7B illustrate an example of a render path question inside the application. FIG. 7A provides the question in an upper portion of the interface, and provides a number of circles of a given color in the lower portion of the interface. An arrow at the bottom of the interface allows the user to move to the interface shown in FIG. 7B. In FIG. 7B, the question is presented in an upper portion of the interface, and a list of possible answers is presented in the lower portion of the interface.

FIG. 7C illustrates an example of code showing the purple color (rgb(145,55,208)), which the bot would reference to answer the survey question. The code may display as a scaled vector graphic (SVG). The code's "fill" property may reflect the object's original color in the code, which is NOT the visual that will be displayed on the screen once rendered. Note the rgb value matches to purple, yet the graphic displayed when the rendering path is complete is red.

FIG. 7D illustrates an example of a graphic that is originally created from the platform control (un-rendered). In FIG. 7D the circles may be purple. The purple circles represent the pre-rendered state of the graphic presented in a question leveraging this feature. The user will perceive an altered end state in the fully rendered graphic, while a bot will read the RGB value of purple.

FIG. 7E illustrates an example of code that shows the replacement color passed through from the platform control. Based on conditional logic, the app is configured to switch the color of the original SVG at runtime, so that the final graphic's color is different from its original code before it is fully rendered in the browser.

FIG. 7F illustrates an example of a graphic that results from the platform control. This is the fully-rendered SVG object/animation which the user will see. In FIG. 7F, the circles may appear as red to the user.

The following is a non-limiting example of operations for using a render path according to an embodiment. The platform presents a respondent with an image depicting one or more specific color(s), the names of several colors for answer choices, and a question asking about a certain color in the image. In the example above, the respondent would see several red circles and be asked, "What color are the circles?" The respondent will either (a) demonstrate their legitimacy by correctly answering the question after allowing the render path to complete, i.e., they will pick the answer option for red, or (b) select purple—RGB (145,55, 208), which is the color a bot-like page-scraping would have found, and provide the platform with a reason to be suspicious.

In an embodiment, reifications rely on the inability of a bot to do either of the following: (1) simulate how human eyes interpret a certain type of optical illusion. (Even if the human users understand the "trick" being played, they still SEE the illusion); and (2) reify, or take the lack of firm certainty about an image and bridge the gap to see, or assume, a more concrete visual representation. The first pathway leverages the fact that even if a real person knows they are being "tricked" (because they are familiar with optical illusions), they can recognize what appears to be true. On the contrary, a bot must rely on actual data, because it is not fooled by this type of illusion.

Figure 8A:
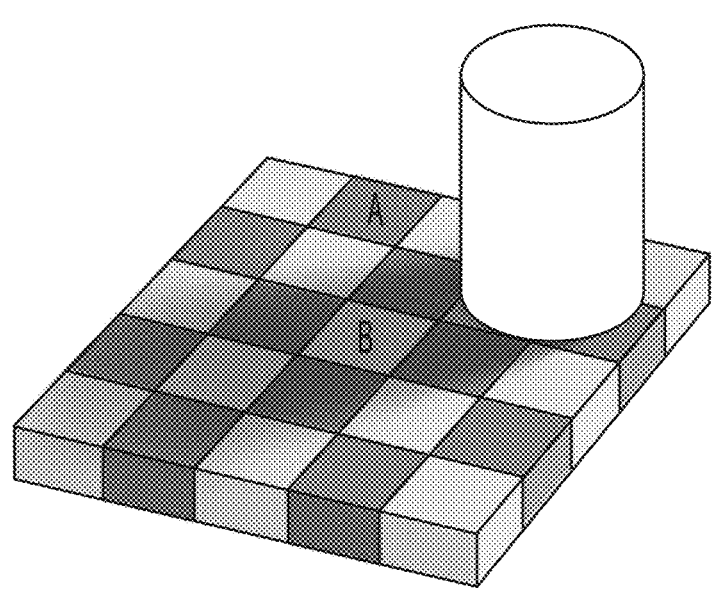
FIG. 8A illustrates an optical illusion according to an example.
Figure 8B:
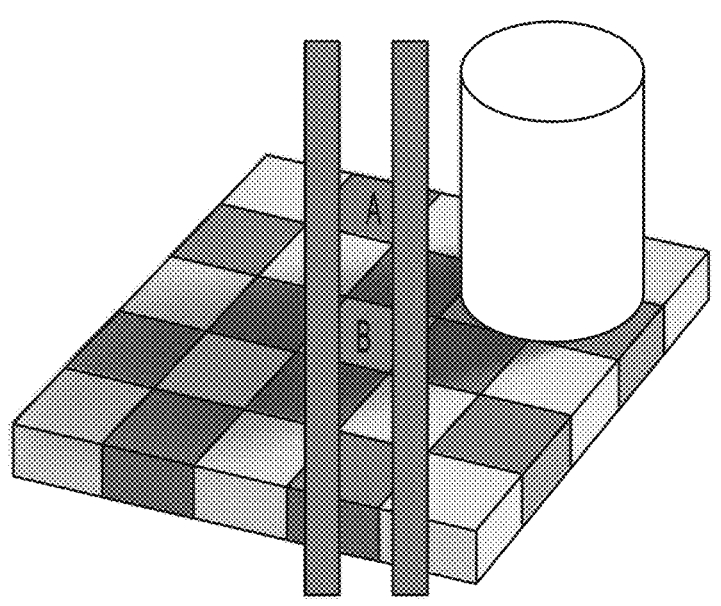
FIG. 8B illustrates an optical illusion according to an example.

FIGS. 8A and 8B illustrates an optical illusion according to an example.

In FIG. 8A, squares A and B appear to be different colors, even though they actually are not. A bot focuses on the actual data and will note these squares are the same shade. However, asking a real person which square seems to be darker/lighter will leverage the power of the optical illusion, and any real person will say that square A looks darker and square B looks lighter, even if some users might know that the squares are probably the same color. FIG. 8B illustrates the same optical illusion, including squares A and B. In FIG. 8B, two vertical bars are provided which link the two squares and show that the squares are the same color and/or tone.

The second pathway leverages the fact that a human user can bridge from the abstract to the concrete despite the fact that real, visual data points are absent. For example, through the use of illusory contours, whereby the perception of a shape is evoked in the human brain without the edges of that shape being literally rendered on the page, bots may be challenged to answer questions about that shape, particularly when questions move a layer beyond the gap that exists between the abstract and concrete.

Figure 9A:
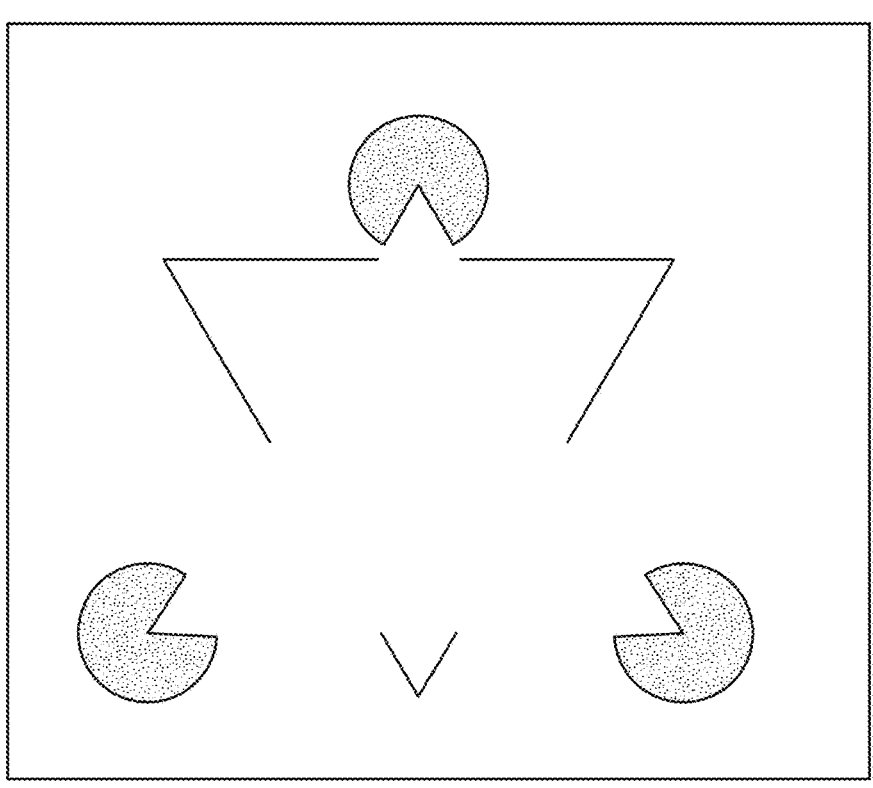
FIG. 9A illustrates reification according to an example.
Figure 9B:
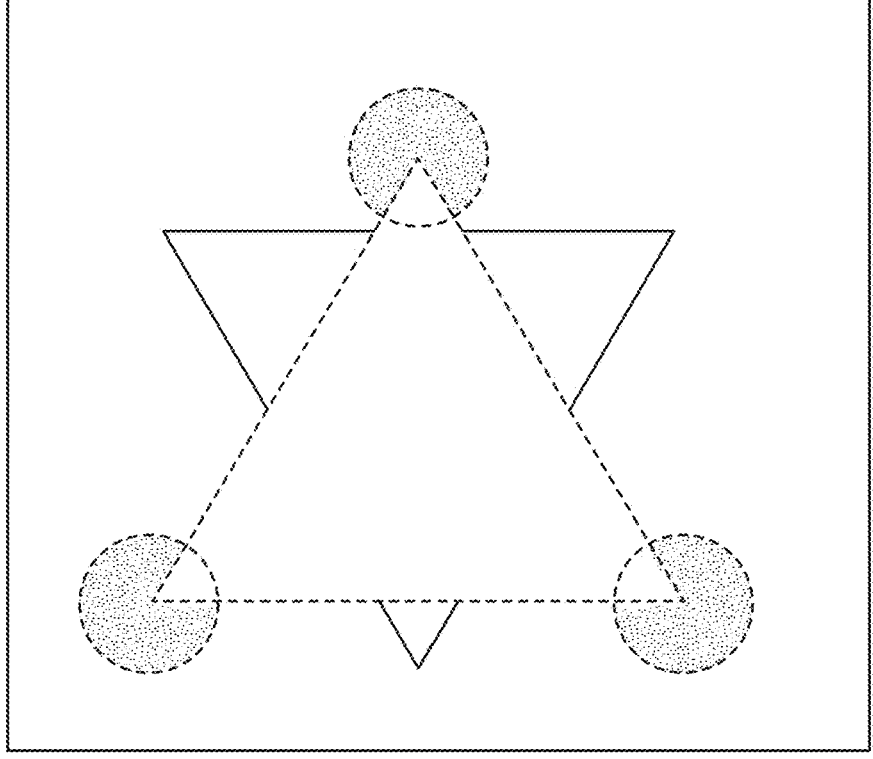
FIG. 9B illustrates reification according to an example.

In FIG. 9A, three sets of lines are provided, and partially circular shapes are provided. The composition of these shapes creates an impression of a triangle overlapping part of circular shapes. The triangle is formed of the negative space defined by the line segments and partially circular shapes. The negative space triangle appears to overlap circles, even though, in the image, only partially circular shapes are shown. FIG. 9B shows what the human brain infers to be present, by providing dotted lines outlining the negative space triangle and the circular shapes.

As a non-limiting example of using reification to test whether a user is a bot, in FIG. 9A, the user might be asked, "how many circles appear to be behind a triangle?" Because there are no true triangles or circles, only the suggestion or perception of them, a bot is unable to correctly answer the question. However, a natural person (such as a human being) will perceive the negative space triangle to be overlapping circles, and may correctly answer that there are three circles that appear to be behind a triangle.

The following is a non-limiting example of operations for using reifications according to an embodiment. A respondent is presented with an optical illusion of some kind, or an example of illusory contours. They are asked a question about their initial perception of the relationships between the displayed figures (optical illusion), or to demonstrate their ability to bridge the gap from abstract to concrete (illusory contours). In the example above, the respondent will answer the question and either (a) demonstrate their legitimacy by correctly answering the question, or (b) provide the platform with a reason to be suspicious.

In an embodiment, fetch guards rely on the inability of a bot to complete simple tasks requiring navigation that is beyond the context of the immediate prompt at hand. Fetch guards ask users to complete a straightforward research task. Users are asked to fetch a piece of information that is easy to find online but requires work external to the prompt or application.

Some non-limiting examples of fetch guards include the following questions: (1) who was the manager of the defeated team in the 1971 MLB World Series? (2) if a tridecagon had three fewer sides, how many sides would it have? (3) if the original Donkey Kong game by Nintendo had been released one year earlier, when would it have been released? (4) For which team did Wayne Gretzky once play? An inability to answer these very easy research questions serves as a guard against bots.

Figure 10:
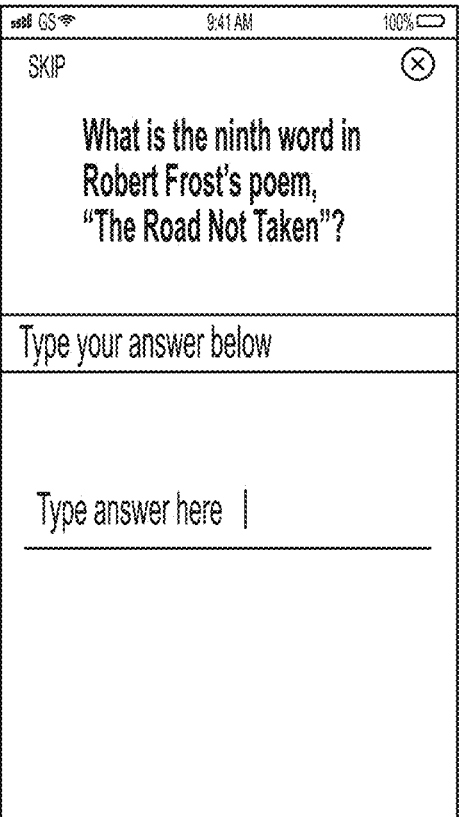
FIG. 10 illustrates a fetch guard according to an example.

FIG. 10 illustrates an example of a fetch guard according to an embodiment. In FIG. 10, a question (what is the ninth word in Robert Frost's poem, "The Road Not Taken?") is provided in the upper portion of the interface. In the lower portion of the interface, an answer field ("Type answer here") is provided which allows the user to input an answer to the question. If the user correctly answers (with the word "sorry") the challenge is passed. If the user cannot answer or incorrectly answers, the challenge is failed.

The following is a non-limiting example of operations for using a fetch guard according to an embodiment. A respondent is presented with a question requiring basic research for an answer that is easy to discover, but unlikely for someone to already know. In the example above, the respondent will answer the question and either (a) demonstrate their legitimacy by completing the research to answer the question correctly, or (b) provide the platform with a reason to be suspicious.

In an embodiment, as used herein, the term "Penrose" refers to a bot-trapping pathway that asks a respondent to observe an image featuring some kind of visual inconsistency and then complete a computation related to the inconsistency. Penrose relies on a bot's inability to (a) discern whether elements of an image are consistent with one another and (b) easily complete computations based solely on imagery.

Figure 12:
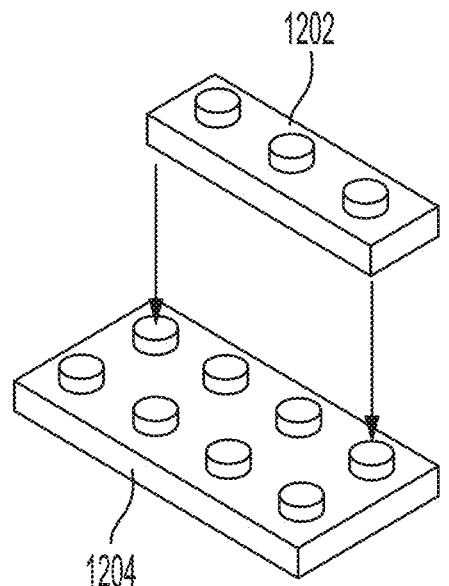
FIG. 12 illustrates a Penrose according to an example.

FIG. 12 illustrates an example of a Penrose according to an embodiment. In this example, the arrows suggest that a 1×3 brick 1202 should be connected lengthwise, end-to-end with a 2×4 brick 1204, which a human will readily recognize as impossible (because three studs cannot align end-to-end with four studs of the same size and spacing). This example is discussed in further detail below.

The following is a non-limiting example of operations for using a Penrose according to an embodiment. A respondent is presented with an image featuring a visual element that is inconsistent with respect to one or more other visual elements, for example the 1×3 brick 1202 and 2×4 brick 1204 shown in FIG. 12. The respondent is asked a question requiring them to compute a value relating to the visual inconsistency. For the example illustrated in FIG. 12, a respondent may be asked, "How many studs must be added to the smaller brick to fix this illustration?" The respondent will answer the question and either (a) demonstrate their legitimacy by answering the question correctly, or (b) provide the platform with a reason to be suspicious.

In an embodiment, the platform is configured to identify bots, to eliminate them from the respondent pool of a survey platform. The platform unobtrusively listens in on survey activity, tracking suspicious, bot-like behavior without compromising the survey experience or blatantly alerting the user. By tracking different types of behaviors over time, the platform can identify "potential bots" for additional scrutiny and can serve up extra questions specifically designed to foil bots, within the framework of the survey platform. Once a respondent is flagged as a potential bot, these extra questions can, with increasing complexity, challenge the suspected bot to prove legitimacy (and therefore usefulness) to the survey platform. If the respondent fails too many tests, the user can be banned from the platform. Removing low quality respondents, especially bots, from a survey platform ultimately results in higher quality survey data. Removing low quality respondents also improves system performance by reducing overhead (processor, memory, storage, network bandwidth, etc.) that would otherwise be required to maintain bots as active users.

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 11:
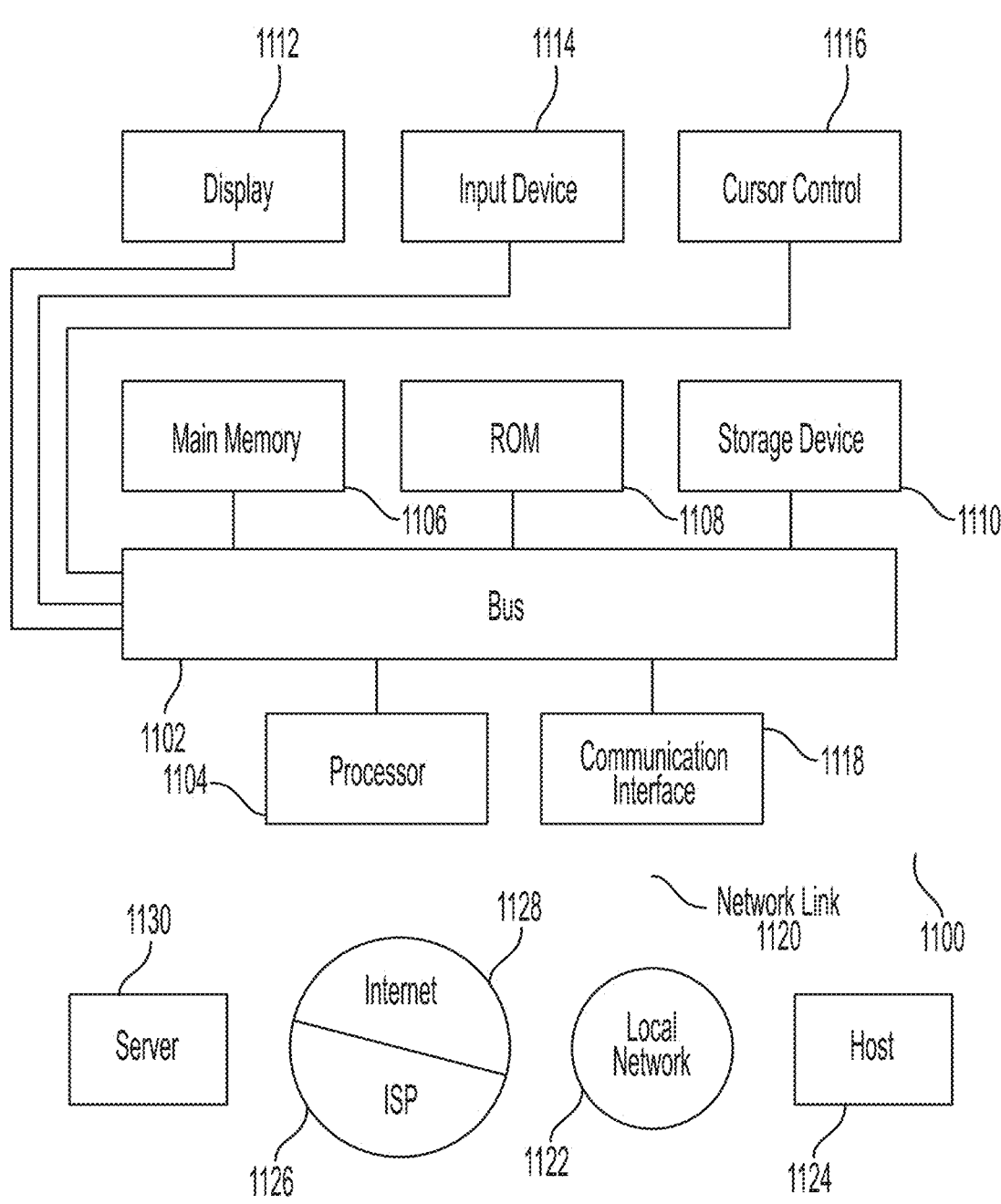
FIG. 11 illustrates a computer system according to an example.

For example, FIG. 11 is a block diagram of an example of a computer system 1100 according to an embodiment.

Computer system 1100 includes a bus 1102 or other communication mechanism for communicating information, and a hardware processor 1104 coupled with the bus 1102 for processing information. Hardware processor 1104 may be a general-purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in one or more non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a liquid crystal display (LCD), plasma display, electronic ink display, cathode ray tube (CRT) monitor, or any other kind of device for displaying information to a computer user. An input device 1114, including alphanumeric and other keys, may be coupled to bus 1102 for communicating information and command selections to processor 1104. Alternatively or additionally, computer system 1100 may receive user input via a cursor control 1116, such as a mouse, a trackball, a trackpad, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. Alternatively or additionally, computer system 11 may include a touchscreen. Display 1112 may be configured to receive user input via one or more pressure-sensitive sensors, multi-touch sensors, and/or gesture sensors. Alternatively or additionally, computer system 1100 may receive user input via a microphone, video camera, and/or some other kind of user input device (not shown).

Computer system 1100 may implement the techniques described herein using customized hard-wired logic, one or more ASICs or FPGAs, firmware, and/or program logic which in combination with other components of computer system 1100 causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 1110.

Volatile media includes dynamic memory, such as main memory 1106. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 1102. Transmission media may also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 1100 may receive the data from the network and place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122, and communication interface 1118.

The received code may be executed by processor 1104 as it is received, and/or stored in storage device 1110, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

Various controllers, such as the processor 1104, a dedicated circuit, an FPGA, ASIC, dedicated computer system, and so forth, may execute various operations discussed above. Using data stored in associated memory and/or storage, the controller also executes one or more instructions stored on one or more non-transitory computer-readable media, which the controller may include and/or be coupled to, that may result in manipulated data. In some examples, the controller may include one or more processors or other types of controllers. In one example, the controller is or includes at least one processor. In another example, the controller performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A non-transitory computer-readable medium storing thereon sequences of computer-executable instructions for determining whether a user of an application is a bot, the sequences of computer-executable instructions including instructions that instruct at least one processor to:

assign the user to a user classification of a plurality of predetermined user classifications for the application based on a user confidence level that reflects a confidence that the user is a human;

provide, responsive to assigning the user to the user classification, a plurality of prompts to the user, the plurality of prompts including one or more first prompts and one or more second prompts, the one or more first prompts including one or more requests for the user to provide data relating to a topic, and the one or more second prompts including one or more challenges of a plurality of challenges to the user over multiple instances of the user using the application, each challenge of the plurality of challenges being configured to determine whether the user is a bot, and each challenge being associated with at least one user classification of the plurality of user classifications;

extract the one or more second prompts from the plurality of prompts to transmit the one or more second prompts, and ignore the one or more first prompts;

transmit the one or more second prompts without including the one or more first prompts; and change the user classification to another user classification of the plurality of predetermined user classifications based on the user's response to the one or more challenges, wherein each user classification of the plurality of predetermined user classifications has a respective ruleset of a plurality of rulesets, each ruleset of the plurality of rulesets containing one or more rules, each rule having a respective trigger associated with a respective reaction, the respective trigger being at least one predetermined antecedent condition that, when met, causes the at least one processor to execute the respective reaction, the respective reaction being a predetermined action.

2. The non-transitory computer-readable medium of claim 1, wherein the one or more challenges of the plurality of challenges include one or more of render paths, memory moats, reification, fetch guards, or Penroses.

3. The non-transitory computer-readable medium of claim 1, wherein the instructions further instruct the at least one processor to monitor the user in the application and provide a reaction responsive to detecting a trigger indicative of the user being a bot, the trigger including a user activity in the application, the trigger and reaction both being associated with a user classification of the plurality of predetermined user classifications.

4. The non-transitory computer-readable medium of claim 3, wherein the reaction includes one or more challenges, the challenges being limited to a predefined subset of all possible challenges, wherein the predefined subset corresponds to the user classification of the user.

5. The non-transitory computer-readable medium of claim 1, wherein each ruleset is constructed by selecting at least one rule from a predefined plurality of rules and associating that rule with the ruleset.

6. The non-transitory computer-readable medium of claim 5, wherein each rule of the one or more rules is constructed by selecting at least one trigger from a predefined set of triggers, selecting at least one reaction from a predefined set of reactions, and associating the at least one trigger with the at least one reaction such that the at least one processor executes the at least one reaction after an occurrence of the at least one trigger.

7. The non-transitory computer-readable medium of claim 1, wherein the instruction further instruct the at least one processor to ban the user responsive to determining that the user is a bot.

8. The non-transitory computer-readable medium of claim 1, wherein a quantity or difficulty of at least one challenge of the one or more challenges associated with a respective user classification of the plurality of user classifications is proportional to a respective level of scrutiny of a plurality of levels of scrutiny associated with the respective user classification.

9. The non-transitory computer-readable medium of claim 8, wherein the plurality of user classifications includes a first user classification associated with a first level of scrutiny of the plurality of levels of scrutiny, and a second user classification associated with a second level of scrutiny of the plurality of levels of scrutiny, the first level of scrutiny being less than the second level of scrutiny.

10. The non-transitory computer-readable medium of claim 9, wherein the at least one processor is further instructed to adjust the user classification by assigning the user a first user confidence level that reflects a confidence that the user is a human between a first threshold and a second threshold, adjusting the first user confidence level to change in a direction of the second threshold responsive to the user providing an incorrect response to the one or more challenges, and adjusting the first user confidence level to change in a direction of the first threshold responsive to the user providing a correct response to the one or more challenge.

11. The non-transitory computer-readable medium claim 10, wherein at least one classification of the plurality of classifications has a respective first threshold and a respective second threshold.

12. The non-transitory computer-readable medium claim 1, wherein the processor is further instructed to provide a first of at least two related challenges at a first time and a second of the at least two related challenges at a second time different than the first time, the first time being during a first use of the application by the user and the second time being during a second use of the application by the user.

13. A method of determining if a user of an application is a bot, the method comprising:

assigning the user to a user classification of a plurality of predetermined user classifications of the application based on a user confidence level that reflects a confidence that the user is a human;

providing, responsive to assigning the user to the user classification, a plurality of prompts to the user, the plurality of prompts including one or more first prompts and one or more second prompts, the one or more first prompts including one or more requests for the user to provide data relating to a topic, and the one or more second prompts including one or more challenges of a plurality of challenges to the user over multiple instances of the user using the application, each challenge of the plurality of challenges being configured to determine whether the user is a bot, and each challenge being associated with at least one user classification of the plurality of user classifications;

extract the one or more second prompts from the plurality of prompts to transmit the one or more second prompts, and ignore the one or more first prompts;

transmit the one or more second prompts without including the one or more first prompts; and changing the user classification to another user classification of the plurality of predetermined user classifications based on the user's responses to the one or more challenges, wherein each user classification of the plurality of predetermined user classifications has a respective ruleset of a plurality of rulesets, each ruleset of the plurality of rulesets containing one or more rules, each rule having a respective trigger associated with a respective reaction, the respective trigger being at least one predetermined antecedent condition that, when met, causes the at least one processor to execute the respective reaction, the respective reaction being a predetermined action.

14. The method of claim 13, wherein the one or more challenges of the plurality of challenges include one or more of render paths, memory moats, reification, fetch guards, or Penroses.

15. The method of claim 13, further comprising monitoring the user in the application and providing a reaction response to detecting a trigger indicative of the user being a bot, the trigger including a user activity in the application, the trigger and reaction both being associated with a user classification of the plurality of predetermined user classifications.

16. The method of claim 15, wherein the reaction includes one or more challenges, the challenges being limited to a predefined subset of all possible challenges, wherein the predefined subset corresponds to the user classification of the user.

17. The method of claim 13, further comprising banning the user responsive to determining that the user is a bot.

18. The method of claim 13, wherein each ruleset is constructed by selecting at least one rule from a predefined plurality of rules and associating that rule with the ruleset.

19. The method of claim 13, wherein each rule of the one or more rules is constructed by selecting at least one trigger from a predefined set of triggers, selecting at least one reaction from a predefined set of reactions, and associating the at least one trigger with the at least one reaction such that the at least one processor executes the at least one reaction after an occurrence of the at least one trigger.

20. A system for determining whether a user of an application is a bot, the system comprising:

a survey platform configured to host the application;

at least one hardware device configured to:

assign the user to a user classification of a plurality of predetermined user classifications on the application based on a user confidence level that reflects a confidence that the user is a human;

detect user activity on the application hosted on the application platform;

provide, responsive to assigning the user to the user classification, a plurality of prompts to the user, the plurality of prompts including one or more first prompts and one or more second prompts, the one or more first prompts including one or more requests for the user to provide data relating to a topic, and the one or more second prompts including one or more challenges of a plurality of challenges to the user over multiple instances of the user using the application, each challenge of the plurality of challenges being configured to determine whether the user is a bot, and each challenge being associated with at least one user classification of the plurality of user classifications;

extract the one or more second prompts from the plurality of prompts to transmit the one or more second prompts, and ignore the one or more first prompts;

transmit the one or more second prompts without including the one or more first prompts; and change the user classification to another user classification of the plurality of predetermined user classifications based on the user's response to the one or more challenges, wherein each user classification of the plurality of predetermined user classifications has a respective ruleset of a plurality of rulesets, each ruleset of the plurality of rulesets containing one or more rules, each rule having a respective trigger associated with a respective reaction, the respective trigger being at least one predetermined antecedent condition that, when met, causes the at least one processor to execute the respective reaction, the respective reaction being a predetermined action.

* * * * *